A

United States Patent
Donmez et al.

(10) Patent No.: US 9,742,499 B2
(45) Date of Patent: Aug. 22, 2017

(54) ADAPTIVE SIGNALING BASED MFSK MODULATION SCHEME FOR ULTRASONIC COMMUNICATIONS

(71) Applicant: TEXAS INSTRUMENTS INCORPORATED, Dallas, TX (US)

(72) Inventors: Mehmet Ali Donmez, Champaign, IL (US); Anand Ganesh Dabak, Plano, TX (US); Il Han Kim, Allen, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/969,852

(22) Filed: Dec. 15, 2015

(65) Prior Publication Data

US 2017/0099109 A1 Apr. 6, 2017

Related U.S. Application Data

(60) Provisional application No. 62/236,585, filed on Oct. 2, 2015.

(51) Int. Cl.
| | | |
|---|---|---|
| *H04L 27/14* | (2006.01) | |
| *H04B 10/556* | (2013.01) | |
| *H04B 3/10* | (2006.01) | |
| *H04L 5/00* | (2006.01) | |

(52) U.S. Cl.
CPC ............ *H04B 10/556* (2013.01); *H04B 3/10* (2013.01); *H04L 5/0048* (2013.01)

(58) Field of Classification Search
CPC .............................. H04L 27/14; H04L 27/1563
USPC ........................... 375/334, 259, 316; 455/39
See application file for complete search history.

(56) References Cited

U.S. PATENT DOCUMENTS

| | | | | |
|---|---|---|---|---|
| 9,361,877 | B2* | 6/2016 | Antonio ................. | H04B 11/00 |
| 2007/0167133 | A1* | 7/2007 | Tomlinson, Jr. ....... | G01N 29/07 |
| | | | | 455/39 |
| 2009/0213942 | A1* | 8/2009 | Holm .................... | H04B 11/00 |
| | | | | 375/259 |
| 2014/0203769 | A1* | 7/2014 | Keeling ................. | H02J 7/007 |
| | | | | 320/108 |

OTHER PUBLICATIONS

Luo et al., "On Approaching Wideband Capacity Using Multitone FSK," IEEE Journal on Selected Areas in Communications, vol. 23, No. 9, pp. 1830-1838 (Sep. 2005).
Scussel et al., "A New MFSK Acoustic Modem for Operation in Adverse Underwater Channels," IEEE 0-7803-4108-2/97, pp. 247-254 (1997).

(Continued)

*Primary Examiner* — Khai Tran
(74) *Attorney, Agent, or Firm* — John R. Pessetto; Charles A. Brill; Frank D. Cimino

(57) ABSTRACT

An ultrasonic communication circuit is disclosed. The circuit includes an ultrasonic transmitter arranged to transmit a training signal having a frequency to a remote transceiver over an ultrasonic communication channel. An ultrasonic receiver is arranged to receive information from the remote transceiver in response to the training signal. The ultrasonic transmitter is arranged to transmit a data signal to the remote transceiver. The data signal has a duty cycle determined by the information.

20 Claims, 8 Drawing Sheets

(56) References Cited

OTHER PUBLICATIONS

Meybodi et al., "Feasibility of Communication Among Pumps in a District Heating System," IEEE pp. 1-11 (2010).
Hosman et al., "Design and Characterization of an MFSK-Based Transmitter/Receiver for Ultrasonic Communication Through Metallic Structures," IEEE Trans. on Instrumentation and Measurement, vol. 60, No. 12, pp. 3767-3774 (Dec. 2011).
Hosman et al. "Multi-Tone FSK for Ultrasonic Communication," OK Conference (2007).
Henkel et al., The Acoustical Channel the Transfer Function of Water Pipes, http://hyperphysics.phy-astr.gsu.edu/hbase/tables/soundv.html, pp. 1-19 (1998).
Sakuma et al., "Two-way communication over gas pipe-line using multicarrier modulated sound waves with cyclic frequency shifting," Acoust. Sci. & Tech. 27, 4 pp. 225-232 (2006).
Chakraborty et al., "Low-rate Ultrasonic Communication Axially along a Cylindrical Pipe," IEEE International Ultrasonics Symposium Proceedings, pp. 547-551 (2014).
Haynes et al., "Ultrasonic Communication Project, Phase 1, FY 1999," Y/NSP-252, pp. 1-108 (Jun. 2000).
Telatar et al., "Capacity and Mutual Information of Wideband Multipath Fading Channels," IEEE Trans.on Information Theory, vol. 46, No. 4, pp. 1384-1400 (Jul. 2000).

\* cited by examiner

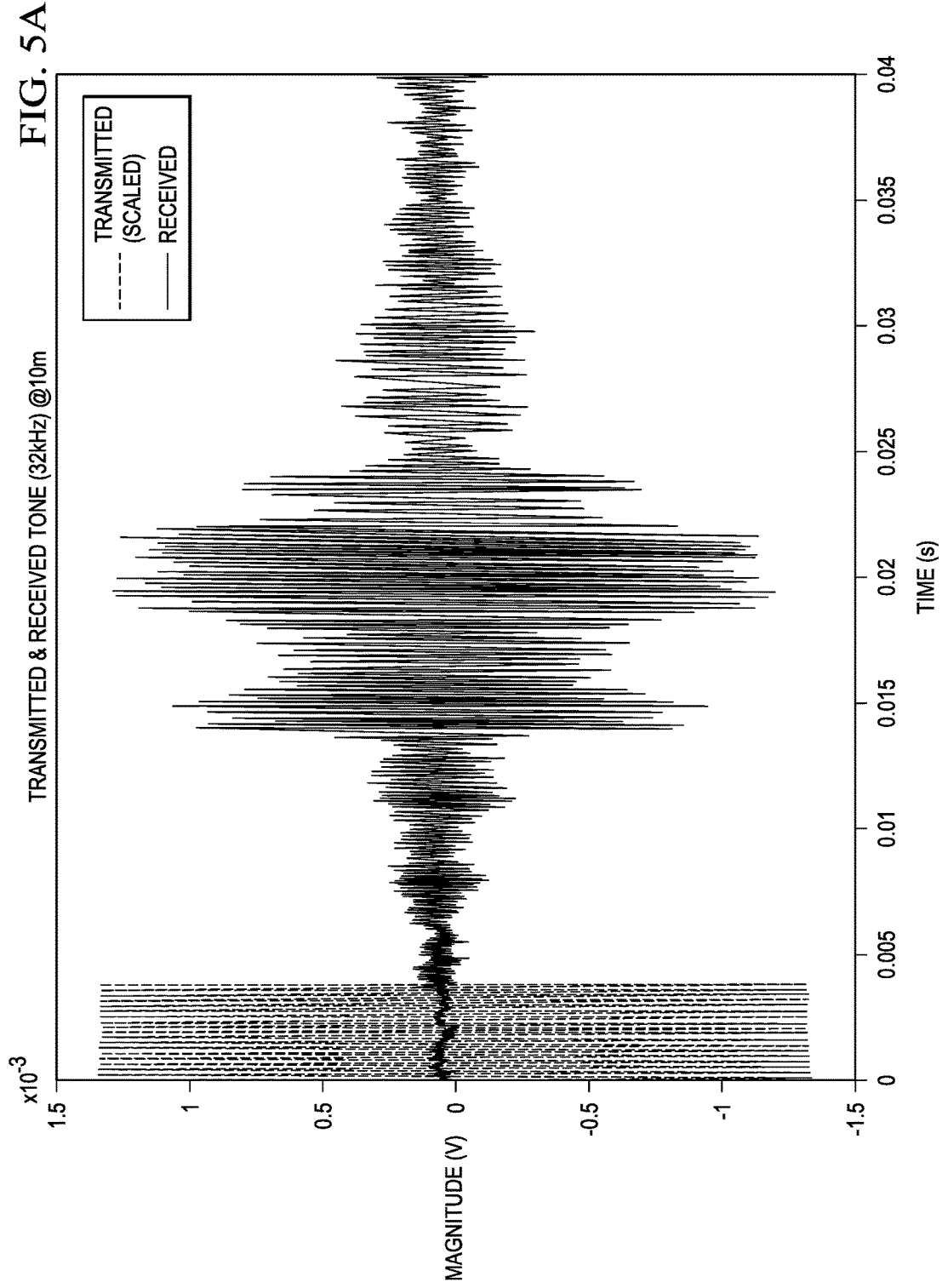

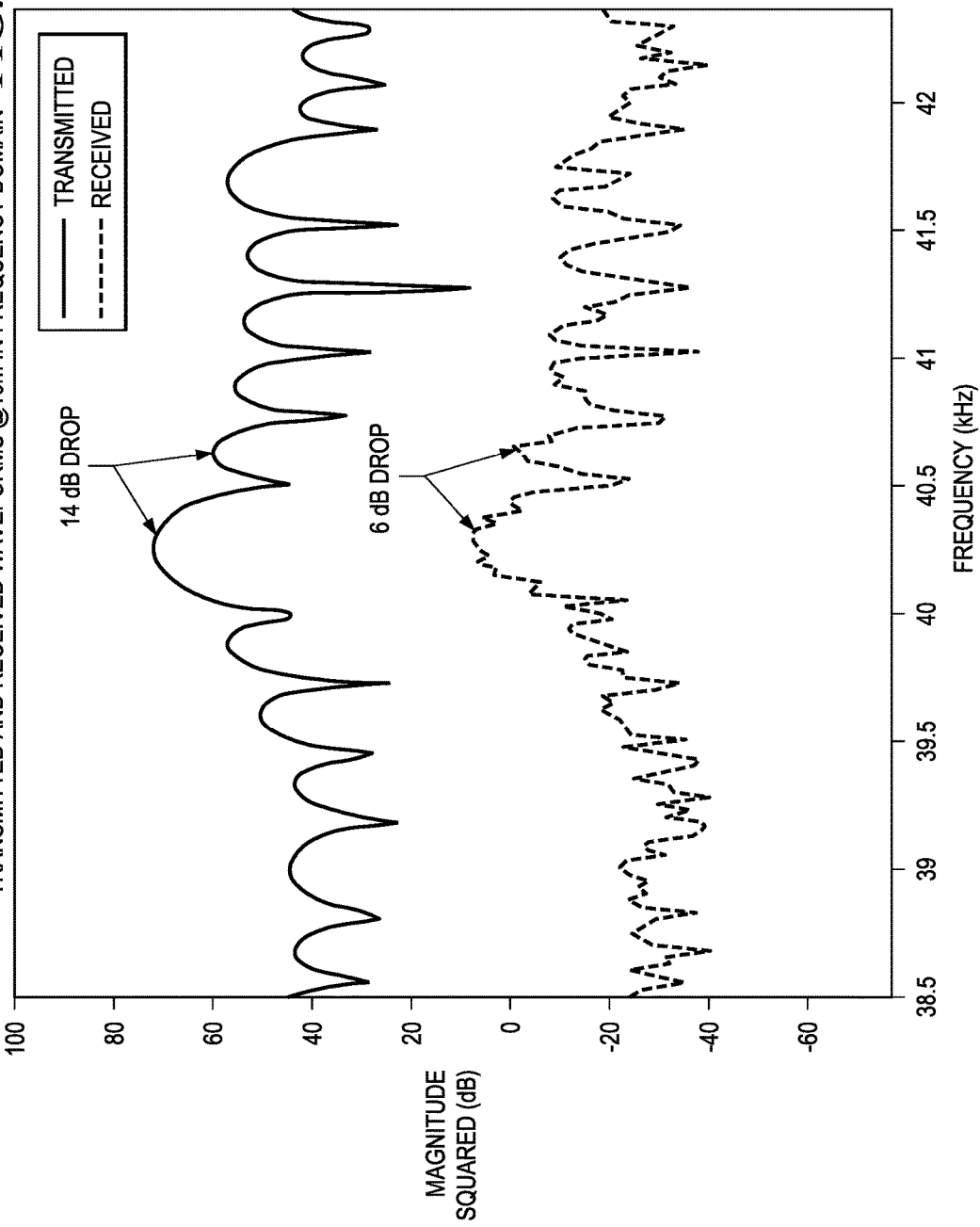

ADAPTIVE SIGNALING BASED MFSK MODULATION SCHEME FOR ULTRASONIC COMMUNICATIONS

CROSS-REFERENCES TO RELATED APPLICATIONS

This application claims the benefit under 35 U.S.C. 119(e) of U.S. Provisional Application No. 62/236,585, filed Oct. 2, 2015, which is incorporated by reference herein in its entirety.

BACKGROUND OF THE INVENTION

Embodiments of the present invention relate to encoding data signals for ultrasonic communication through a multipath fading channel.

Ultrasound technology has been developed for practical applications such measuring fluid velocity in a pipe, measuring characteristics of a pipe and of fluid in the pipe, ultrasonic communication through various media such as metal pipes, underwater acoustic measurements, medical applications, and numerous other applications.

Referring to FIG. 1, for example, Hosman et al., "Design and Characterization of an MFSK-Based Transmitter/Receiver for Ultrasonic Communication Through Metallic Structures," IEEE Trans. On Instrumentation and Measurement, Vol. 60, No. 12, pp. 3767-3774 (December 2011) disclose an ultrasonic communication system for communicating through steel corner posts of shipping containers, which is incorporated herein by reference in its entirety. The communication system transmits multitone frequency-shift keyed (MFSK) data through the steel corner posts by means of attached ultrasonic transducers to a receiver external to the shipping containers. The steel corner posts are characterized as a metal multipath fading channel. Hosman et al. employ an MFSK encoding system as shown at FIG. 2. A data word is applied to a symbol encoder to selectively apply frequencies $f_0$ through $f_{N-1}$ to a sum circuit. The selected frequencies are then applied to an ultrasonic transducer for transmission through the steel corner posts. The MFSK system of Hosman et al. uses different combinations of Q summed tones from N available tones to produce $$\binom{N}{Q}$$

MFSK symbols, where $$\binom{N}{Q}$$

is defined as $N!/(Q!(N-Q)!)$. MFSK encoding advantageously produces substantially more encoded symbols than traditional frequency shift keyed (FSK) encoding as shown at FIG. 3. Here, for example, N=32 available tones will encode 5 bits ($\log_2(32)$) in each FSK symbol. By way of comparison, MFSK will encode 29 bits or the integer portion of $\log_2$ $$\log_2\binom{N}{Q}$$

for Q=16. This results in a significantly higher data rate for MFSK encoding with the same number of available tones. The present inventors have realized a need to improve communication techniques through the multipath fading channel to further improve data throughput and reduce symbol error rate (SER). Accordingly, the preferred embodiments described below are directed toward improving upon the prior art.

BRIEF SUMMARY OF THE INVENTION

In a first embodiment of the present invention, an ultrasonic communication circuit is disclosed. The circuit includes an ultrasonic transmitter arranged to transmit a training signal having a respective frequency to a remote transceiver over an ultrasonic communication channel. An ultrasonic receiver is arranged to receive information from the remote transceiver in response to the training signal. The ultrasonic transmitter is arranged to transmit a data signal to the remote transceiver with a duty cycle determined by the information.

In a second embodiment of the present invention, an ultrasonic communication circuit is disclosed. The circuit includes an ultrasonic receiver arranged to receive a training signal having a frequency from a remote transceiver over an ultrasonic communication channel. An ultrasonic transmitter is arranged to transmit information to the remote transceiver in response to the training signal. The ultrasonic receiver is arranged to receive a data signal having a duty cycle determined by the information from the remote transceiver.

In a third embodiment of the present invention, a method of modulating a duty cycle of an ultrasonic signal is disclosed. The method includes transmitting a plurality of training signals to a remote transceiver through an ultrasonic communication channel, wherein each training signal has a respective frequency. The method further includes receiving information for each respective frequency and transmitting a data signal having a duty cycle determined by the information to the remote transceiver through the ultrasonic communication channel.

BRIEF DESCRIPTION OF THE SEVERAL VIEWS OF THE DRAWING

FIG. 5A is a diagram comparing a 32 kHz transmitted waveform with a corresponding waveform received through a 10 meter copper pipe;

FIG. 5B is a diagram comparing the frequency domain of a 40.25 kHz transmitted waveform with a corresponding frequency domain of the waveform received through a 10 meter copper pipe;

DETAILED DESCRIPTION OF THE INVENTION

The preferred embodiments of the present invention provide significant advantages in symbol error rate (SER) and resulting data throughput of ultrasonic transmission through various conducting media over methods of the prior art as will become evident from the following detailed description.

Figure 1:
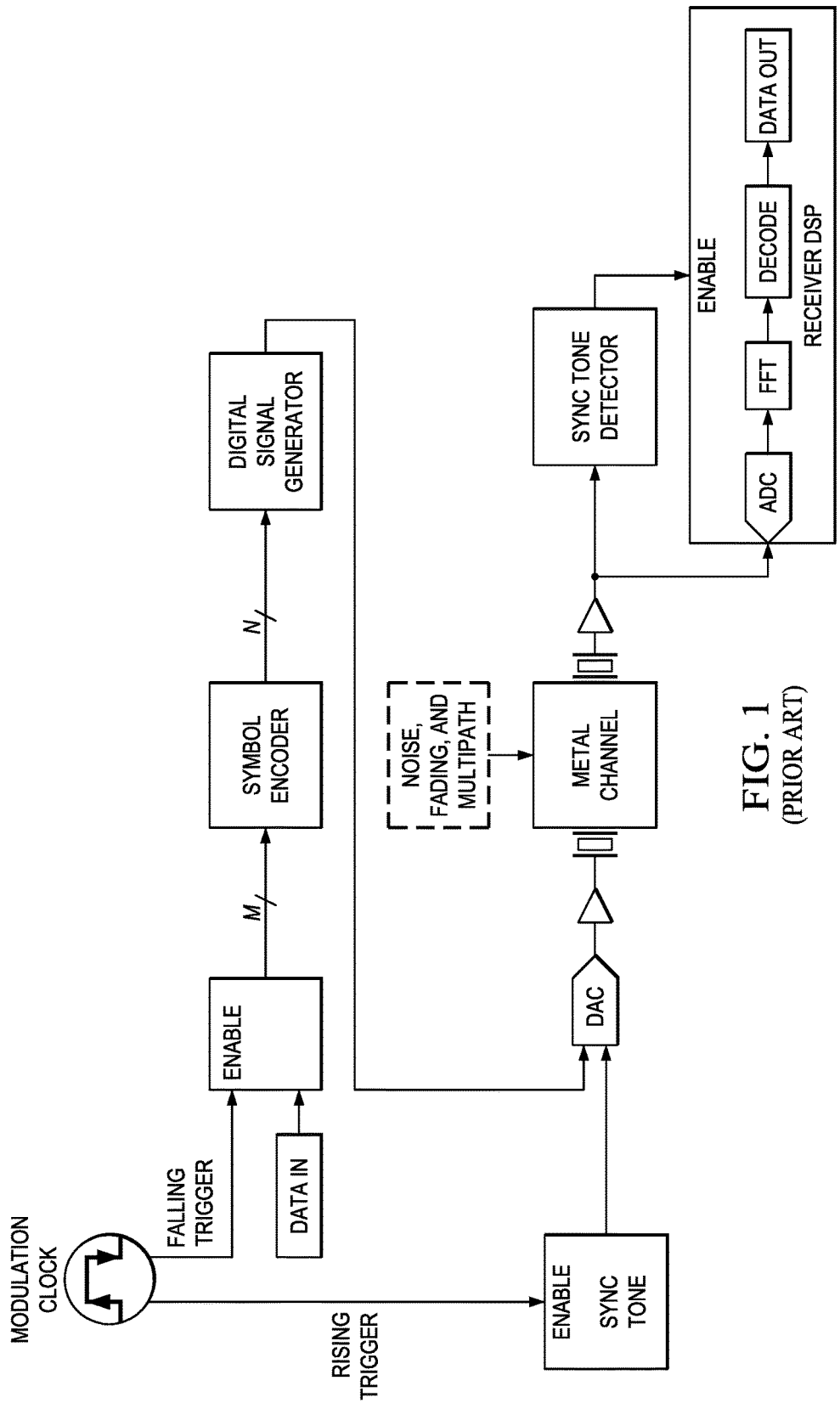
FIG. 1 is a simplified diagram of an ultrasonic communication system of the prior art.
Figure 2:
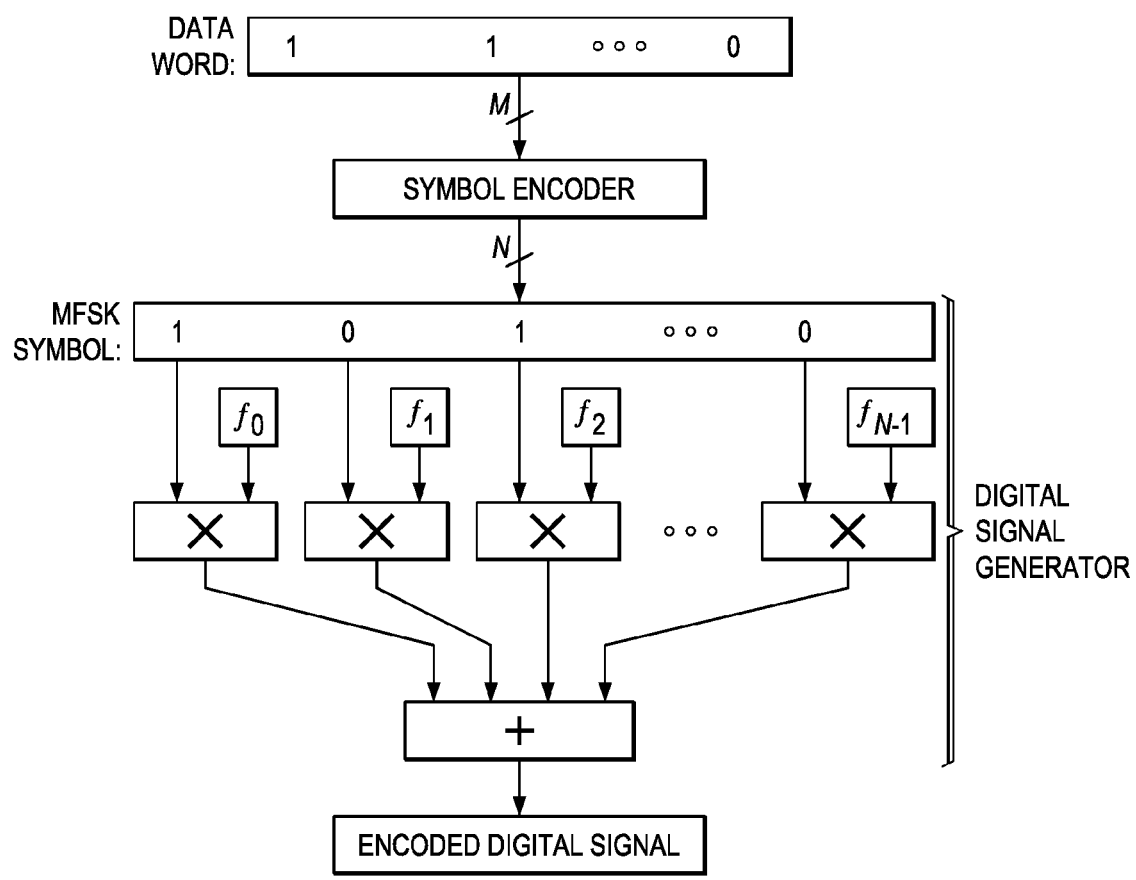
FIG. 2 is a multitoned frequency-shift keyed (MFSK) encoding system of the prior art.
Figure 3:
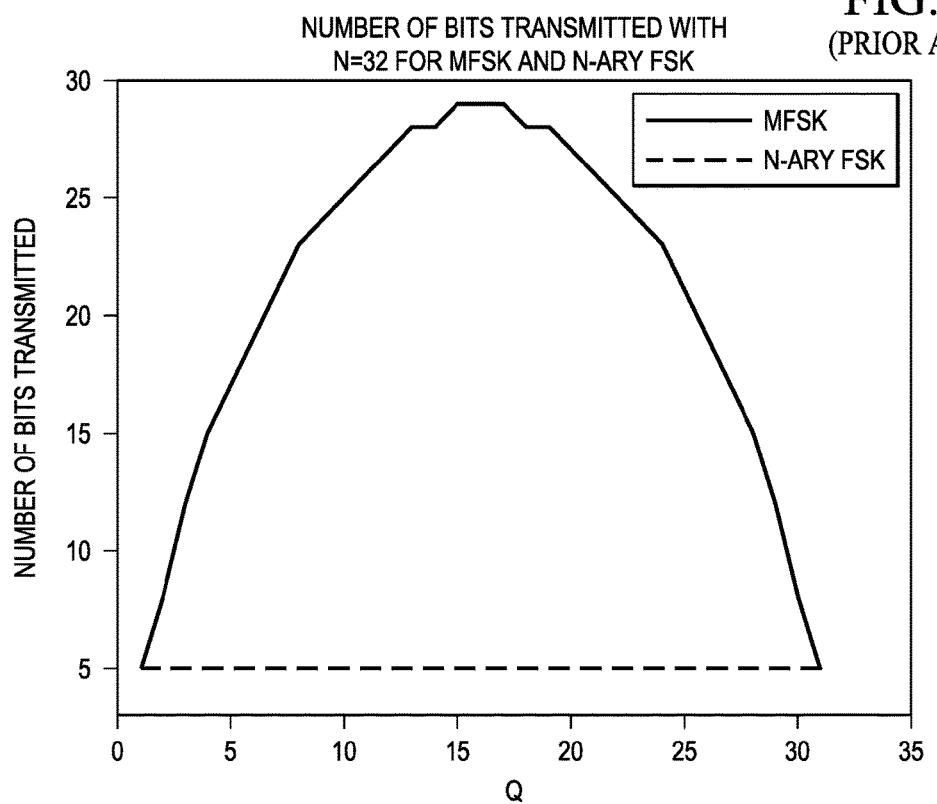
FIG. 3 is a diagram comparing frequency-shift keyed (FSK) bits/symbol to multitoned frequency-shift keyed (MFSK) bits/symbol as a function of Q of N available tones.
Figure 4:
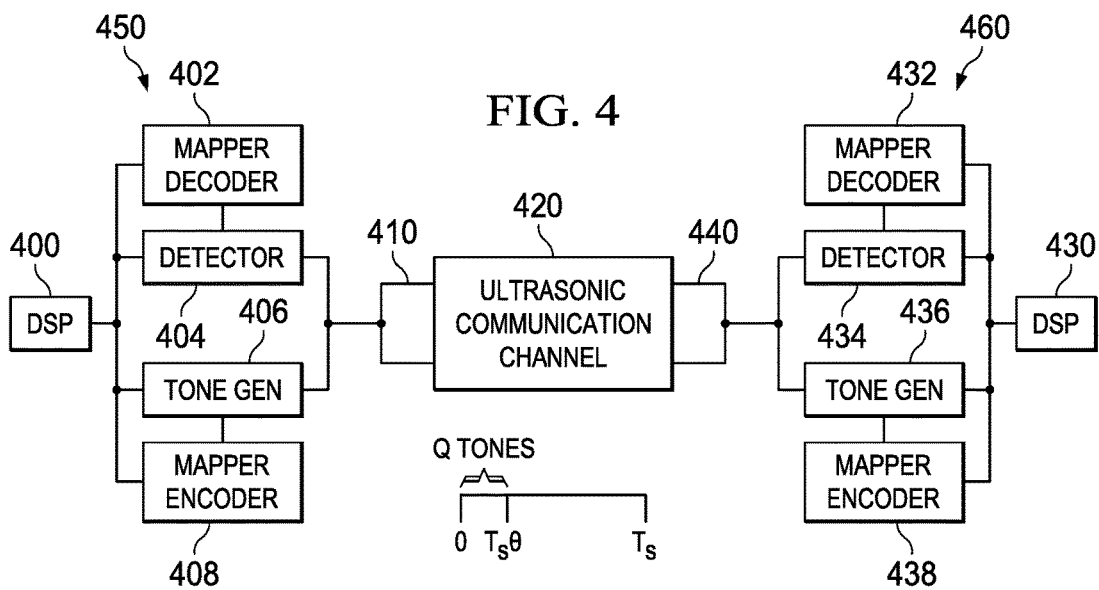
FIG. 4 is a diagram of an ultrasonic communication system of the present invention.

Referring to FIG. 4, there is a diagram of a bidirectional ultrasonic communication system of the present invention. The system includes a first communication module or transceiver 450 arranged to communicate over an ultrasonic communication channel 420 with a second communication module or transceiver 460. Transceivers 450 and 460 are remote from one another and separated by ultrasonic communication channel 420. The ultrasonic communication channel may be solid, fluid or gas media and may be situated in an environment where wired or wireless communication is difficult. For example, the ultrasonic communication channel 420 may be a metal pipe that was previously installed in a commercial or residential complex, a buried pipe or conduit for fluid or gas transmission, a metal frame or support structure, or other conducting media. Moreover, the media may be a plastic material such as polyvinyl chloride (PVC), polyethylene (PE), or other conducting media. The present inventors have determined that a wide variety of conducting media may be characterized as a multipath fading channel for conducting ultrasonic signals.

The first communication module 450 includes a digital signal processor (DSP) 400 or other suitable processor having signal processing capability. This preferably includes analog-to-digital conversion (ADC), fast Fourier transform (FFT), and inverse fast Fourier transform (IFFT) capability. DSP 400 is coupled to mapper/decoder circuit 402 and detector circuit 404 to form a first ultrasonic receiver for receiving ultrasonic signals from transducer 410. DSP 400 is also coupled to mapper/encoder circuit 408 and tone generator circuit 406 to form a first ultrasonic transmitter for transmitting ultrasonic signals through ultrasonic communication channel 420 via transducer 410. The second communication module 460 includes a DSP 430 or other suitable processor. DSP 430 is coupled to mapper/decoder circuit 432 and detector circuit 434 to form a second ultrasonic receiver for receiving ultrasonic signals from the first communication module 450 over ultrasonic communication channel 420 via transducer 440. DSP 430 is also coupled to mapper/encoder circuit 438 and tone generator circuit 436 to form a second ultrasonic transmitter for transmitting ultrasonic signals through ultrasonic communication channel 420 to the first communication module 450 via transducer 440.

In operation, a digital data word at DSP 400 is mapped and encoded 408 to select a corresponding set of Q ultrasonic tones or frequencies from M available tones or frequencies, where Q and M are positive integers. Circuit 408 is preferably a multitone frequency-shift keyed (MFSK) mapper and encoder. The M tones or frequencies may be spaced apart in a linear manner by a minimum frequency spacing $\Delta f$. The set of Q of the tones may be selected subject to minimum tone separation (MTS) from the set of M tones to encode each N-bit data word as disclosed in copending application Ser. No. 14/969,227 (TI-76451), filed Dec. 15, 2015, and incorporated by reference herein in its entirety. Here, N is less than or equal to an integer part of $\log_2$ $$\log_2\binom{M}{Q}.$$

Tone generator 406 produces and applies the Q selected ultrasonic tones to transducer 410. The selected Q tones representing an N-bit data word are subsequently transmitted during a symbol time Ts having a duty cycle $\theta$ by ultrasonic transducer 410 attached to the conductive media that forms ultrasonic communication channel 420. Transducer 440 receives the Q ultrasonic tones transmitted through ultrasonic communication channel 420. The received tones, however, are distorted by delay spreading due to multipath fading of ultrasonic communication channel 420. Detector 434 receives the ultrasonic signals from transducer 440 and identifies the individual of tones. Mapper/decoder circuit 432 demaps and decodes the message represented by the set of Q tones and transmits the received data word to DSP 430.

DSP 430 of the second communication module 460 may also initiate transmissions to the first communication module 450. A digital data word at DSP 430 is mapped and encoded 438 to select a corresponding set of Q ultrasonic tones or frequencies from M available tones or frequencies. Circuit 438 is similar to circuit 408 and is preferably a multitone frequency-shift keyed (MFSK) mapper and encoder. Tone generator 436 produces and applies the Q selected ultrasonic tones to transducer 440. The selected Q tones representing an N-bit data word are subsequently transmitted by ultrasonic transducer 440 through ultrasonic communication channel 420. Transducer 410 receives the Q ultrasonic tones, which are also distorted by delay spreading due to multipath fading of ultrasonic communication channel 420. Detector 404 receives the ultrasonic signals from transducer 410 and identifies the individual of tones. Mapper/decoder circuit 402 demaps and decodes the message represented by the set of Q tones and transmits the received data word to DSP 400.

Turning now to FIG. 5A, there is a diagram comparing a transmitted 32 kHz sinusoidal waveform with a corresponding waveform received through a 10 meter copper pipe. The transmitted signal has a peak-to-peak voltage of 10 V and is scaled for comparison with the 1.3 mV peak-to-peak voltage of the received signal. The received signal illustrates severe delay spreading due to multipath fading that may occur in complex ultrasonic structures. The magnitude of the adjacent side lobes of the received signal are only slightly less than the primary received signal. When superimposed on other of the Q tones in an N-bit data word, this may lead to detection problems and an increased symbol error rate (SER) at the receiver.

FIG. 5B is a diagram comparing the frequency domain of a 40.25 kHz transmitted waveform with a corresponding frequency domain of the waveform received through a 10 meter copper pipe. The diagram illustrates a first side lobe of the transmitted signal at 40.55 kHz is 14 dB less than the magnitude of the transmitted signal at 40.25 kHz. However, the first side lobe of the received signal is only 6 dB less than the magnitude of the received signal at 40.25 kHz. This is primarily because the multipath channel does not equally attenuate each frequency. The receiver, therefore, may confuse a real peak of one of the Q transmitted tones with a side lobe of another tone of the Q transmitted tones. This results in a detection errors and an increased SER.

Figure 6A:
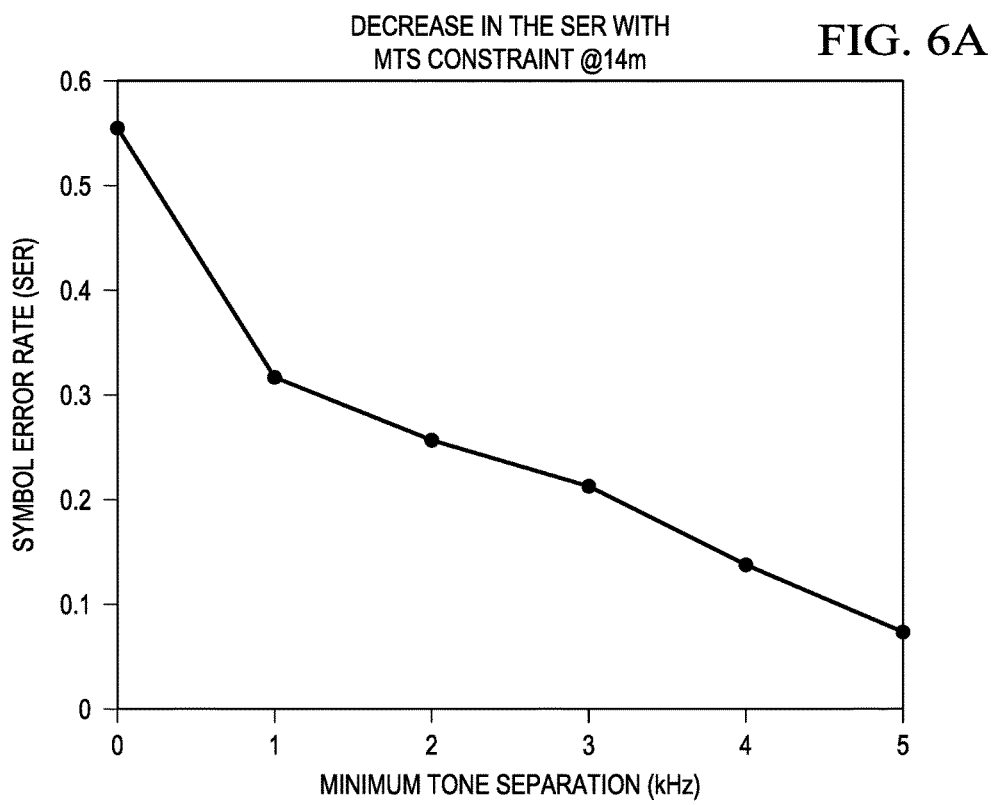
FIG. 6A is a diagram showing symbol error rate (SER) as a function of minimum tone separation (MTS) for 14 meter transducer separation.
Figure 6B:
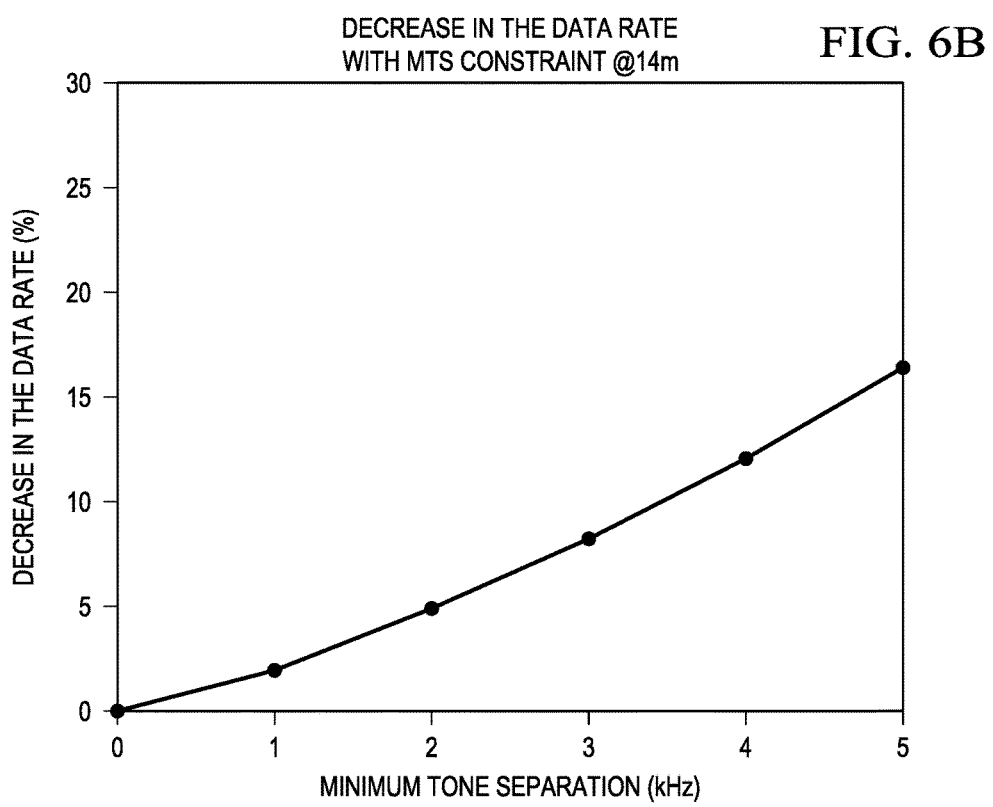
FIG. 6B is a diagram showing a percentage decrease in data rate as a function of minimum tone separation (MTS) for 14 meter transducer separation.

The present inventors have determined that significant a reduction in SER is possible with only a small reduction in data throughput by implementing a minimum tone spacing (MTS) within the set of Q selected tones representing a data word. FIG. 6A is a diagram showing symbol error rate (SER) for a transmit/receive transducer separation of 14 meters as a function of minimum tone separation (MTS). FIG. 6B is a diagram showing a percentage decrease in data rate for a transmit/receive transducer separation of 14 meters as a function of minimum tone separation (MTS). FIGS. 6A and 6B graphically illustrate significant advantages of an MFSK system with MTS over the prior art.

Figure 7:
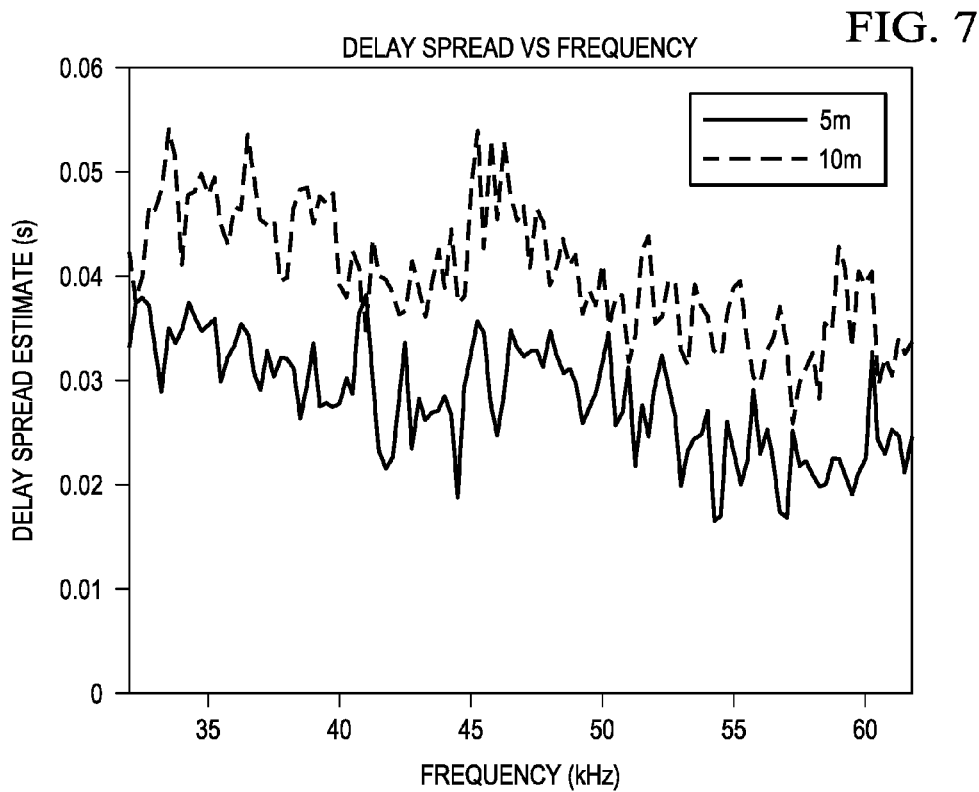
FIG. 7 is a diagram showing delay spreading of an ultrasonic signal transmitted through a copper pipe as a function of frequency for 5 and 10 meter transducer separation.

The present inventors have also determined that time domain delay spreading over communication channel 420 (FIG. 4) is a strong function of the transmitted ultrasonic frequency. Referring to FIG. 7, there is a diagram showing delay spreading of ultrasonic signals from 32 kHz to 62 kHz transmitted through a copper pipe as a function of frequency for 5 and 10 meter transducer separation. Here, delay spreading is a time difference between the transmitted signal duration and the received signal duration. Referring back to FIG. 5A, for example, a 4 ms transmitted signal duration produces a 29 ms received signal, for 25 ms delay spreading. The diagram of FIG. 7 shows a strong frequency dependence with maximum delay spreading at low frequencies and minimum delay spreading at high frequencies. For 5 meter transducer separation, delay spreading decreases from approximately 35 ms to 25 ms over the frequency range of 32 kHz to 62 kHz and is approximately linear. A similar decrease in delay spreading from approximately 50 ms to 35 ms over the frequency range of 32 kHz to 62 kHz occurs for 10 meter transducer separation.

Figure 8:
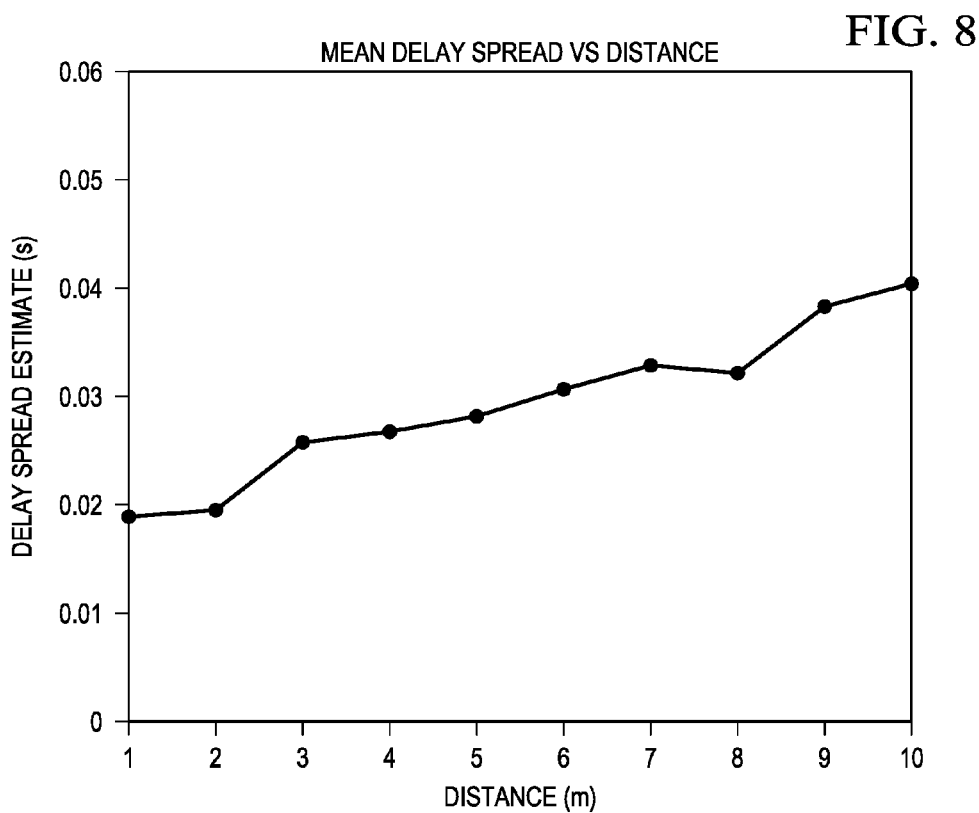
FIG. 8 is a diagram showing mean delay spreading of an ultrasonic signal transmitted through a copper pipe as a function of transducer separation.

Furthermore, delay spreading is a strong function of transducer separation. FIG. 8 is a diagram showing mean delay spreading of an ultrasonic signal transmitted through a copper pipe as a function of transducer separation. The vertical axis shows mean delay spreading over the frequency range of 32 kHz to 62 kHz as a function of distance along the horizontal axis from 1 to 10 meters. Delay spreading increases with increasing transducer separation from 20 ms to 40 ms.

Figure 9A:
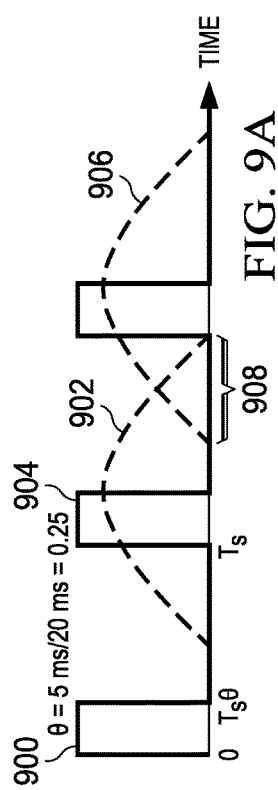
FIG. 9A is a timing diagram showing received signals and overlap with a 0.25 duty cycle.

Turning now to FIG. 9A, there is a timing diagram showing transmitted signals and overlap of received signals with a 0.25 duty cycle. A first transmitted signal 900 includes plural sine waves having a 5 ms duration $T_S\theta$ and a symbol time $T_S$ of 20 ms. The duty cycle of transmitted waveform 900, therefore, is 5 ms/20 ms=0.25. Transmitted signal 900 is subject to delay spreading as previously discussed and is received as signal 902. A second signal 904 also includes plural sine waves having a 5 ms duration and is transmitted at the end of the first symbol time $T_S$. Transmitted signal 904 is also subject to delay spreading and is received as signal 906. The delay spreading of received signals 902 and 906 have a significant overlap in region 908. A superposition of signals 902 and 906 in this overlap region may have sufficient magnitude to cause synchronization and detection problems at the receiver as well as increased SER.

Figure 9B:
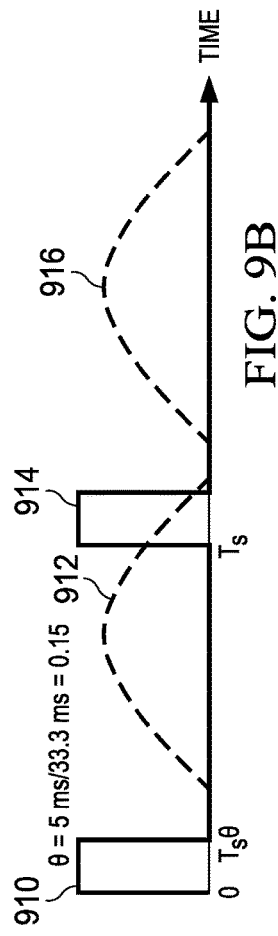
FIG. 9B is a timing diagram showing received signals without overlap with a 0.15 duty cycle.

Referring next to FIG. 9B, there is a timing diagram showing transmitted and received signals as in FIG. 9A but with a 0.15 duty cycle. A first transmitted signal 910 includes plural sine waves having a 5 ms duration $T_S\theta$ and a symbol time $T_S$ of 33.3 ms. The duty cycle of transmitted waveform 910, therefore, is 5 ms/33.3 ms=0.15. Transmitted signal 910 is subject to delay spreading as previously discussed and is received as signal 912. A second signal 914 also includes plural sine waves having a 5 ms duration. Due to the duty cycle reduction, however, signal 914 is transmitted at the end of the first symbol time $T_S$ at 33.3 ms. Transmitted signal 914 is also subject to delay spreading and is received as signal 916. Here, however, received signals 912 and 916 do not overlap. The reduced duty cycle, therefore, advantageously decreases adjacent signal interference and reduces SER. The reduced duty cycle, however, may also reduce data throughput. The present inventors, therefore, have realized a need to accurately adjust the duty cycle of a transmitted signal to optimize data throughput with minimal interference.

Figure 10:
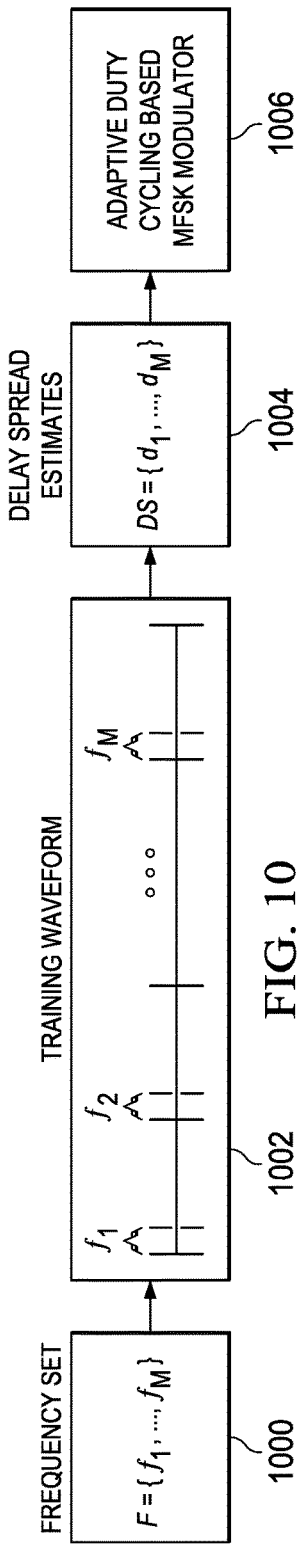
FIG. 10 is a flow diagram showing training waveform transmission and adaptive duty cycle determination according to the present invention.

Referring now to FIG. 10, a flow diagram showing training waveform transmission and adaptive duty cycle determination according to the present invention will be described with reference to FIG. 4. The flow diagram begins at block 1000 when a set of M frequencies is selected. Communication module 450 transmits each of the M frequencies through communication channel 420 to communication module 460. Each frequency of the training waveforms includes plural sine waves having a duration known to the receiving module and a sufficiently small duty cycle to assure adjacent received signals do not overlap. The training waveforms are preferably transmitted with a constant duty cycle θ and symbol time $T_S$ so that communication module 460 remains synchronized with communication module 450. Communication module 460 receives the sequence of training waveforms and performs delay spread estimates at block 1004. The delay spread estimates are based on a threshold of measured received signal energy for each frequency. For example, when received signal energy of training signal frequency $f_1$ exceeds a threshold, communication module 460 defines this as a start time. Likewise, when received signal energy of training signal frequency $f_1$ falls below the threshold, communication module 460 defines this as an end time. Since communication module 460 knows the duration of the transmitted training waveform, it calculates the respective delay spread $d_1$ for frequency $f_1$. The process is repeated for each training waveform frequency $f_1$ through $f_M$ for a set of delay spread estimates DS. The receiver then calculates an appropriate duty cycle for each frequency. The appropriate duty cycle is preferably as large as possible without creating adjacent received signal overlap 908 (FIG. 9A). The selected duty cycles for each frequency or frequency range are transmitted from communication module 460 to communication module 450. Communication module 450 uses these received duty cycles in as an adaptive duty cycle based modulator 1006 in tone generator 406.

In operation, communication modules 450 and 460 assume reciprocity of communication channel 420. Thus, both communication modules use the same adaptive duty cycles for their respective transmissions. When communication module 450 transmits an MFSK symbol of Q tones to communication module 460, it uses the duty cycle of the worst case frequency of the Q tones. The transducer space between transducers 410 and 440 remains fixed, so the worst case duty cycle corresponds to the lowest frequency of the Q tones in the received MFSK symbol. Communication module 460 receives and decodes the MFSK symbol from communication module 450. Communication module 460 determines the duty cycle θ from the lowest frequency of the Q tones. Thus, communication module 460 also knows the symbol time $T_S$ of the received MFSK symbol and, therefore, the arrival time of the next MFSK symbol. There may be as many as M duty cycles corresponding to the M selected frequencies. It may be desirable, however, to limit the number of duty cycles to K subsets of the M frequencies, where each subset corresponds to a range of the M ultrasonic frequencies. In this case, it may only be necessary to use the lowest frequency in each K subset as a training waveform, thereby reducing calibration time. It may also be desirable to exclude some of the M frequencies that require very short duty cycles to improve throughput. In another embodiment of the present invention, communication module 450 may communicate delay spread estimates 1004 directly to communication module 440, and both modules may separately determine appropriate duty cycles.

The foregoing embodiments of the present invention advantageously provide multitone frequency-shift keyed (MFSK) communication with minimum adjacent symbol interference by adaptive duty cycle modulation. The foregoing training sequence of FIG. 10 is preferably repeated when transducer spacing or ultrasonic channel characteristics are changed. However, it may be periodically repeated to compensate for temperature variation, ambient noise, fluid-filled conduction media of the communication channel, or other transient characteristics that may affect the ultrasonic communication channel.

Still further, while numerous examples have thus been provided, one skilled in the art should recognize that various modifications, substitutions, or alterations may be made to the described embodiments while still falling within the inventive scope as defined by the following claims. Other combinations will be readily apparent to one of ordinary skill in the art having access to the instant specification.

The invention claimed is:

1. A communication circuit, comprising:
an ultrasonic transmitter arranged to transmit a training signal having a frequency to a remote transceiver over an ultrasonic communication channel; and
an ultrasonic receiver arranged to receive information from the remote transceiver in response to the training signal,
wherein the ultrasonic transmitter is arranged to transmit a data signal to the remote transceiver having a duty cycle determined by the information.

2. The communication circuit of claim 1, wherein the information is a delay spread estimate of the ultrasonic communication channel.

3. The communication circuit of claim 1, wherein the information is a duty cycle for transmissions of the ultrasonic transmitter.

4. The communication circuit of claim 1, wherein the training signal comprises a plurality of frequencies, and wherein the information includes a respective plurality of delay spread estimates.

5. The communication circuit of claim 1, wherein the training signal comprises a plurality of frequencies, and wherein the information includes a respective plurality of duty cycles.

6. The communication circuit of claim 1, wherein the ultrasonic transmitter is arranged to transmit the training signal periodically.

7. The communication circuit of claim 1, wherein the data signal is a multitone frequency shift keyed (MFSK) signal.

8. The communication circuit of claim 7, wherein a duty cycle of the MFSK signal is determined by a lowest frequency of the MFSK signal.

9. A communication circuit, comprising:
an ultrasonic receiver arranged to receive a training signal having a frequency from a remote transceiver over an ultrasonic communication channel; and
an ultrasonic transmitter arranged to transmit information to the remote transceiver in response to the training signal,
wherein the ultrasonic receiver is arranged to receive a data signal having a duty cycle determined by the information from the remote transceiver.

10. The communication circuit of claim 9, wherein the information is a delay spread estimate of the ultrasonic communication channel.

11. The communication circuit of claim 9, wherein the information is a duty cycle for transmissions of the remote transceiver.

12. The communication circuit of claim 9, wherein the training signal comprises a plurality of frequencies, and wherein the information includes a respective plurality of delay spread estimates.

13. The communication circuit of claim 9, wherein the training signal comprises a plurality of frequencies, and wherein the information includes a respective plurality of duty cycles.

14. The communication circuit of claim 9, wherein the ultrasonic receiver is arranged to receive the training signal periodically.

15. The communication circuit of claim 9, wherein the data signal is a multitone frequency shift keyed (MFSK) signal.

16. The communication circuit of claim 15, wherein a duty cycle of the MFSK signal is determined by a lowest frequency of the MFSK signal.

17. A method of modulating a duty cycle of an ultrasonic signal, comprising:
transmitting plurality of training signals to a remote transceiver through an ultrasonic communication channel, each training signal having a respective frequency;
receiving information for each respective frequency; and
transmitting a data signal having a duty cycle determined by the information to the remote transceiver through the ultrasonic communication channel.

18. The method of claim 17, wherein the information comprises a duty cycle for each respective frequency.

19. The method of claim 17, wherein the information comprises a delay spread estimate for each respective frequency.

20. The method of claim 17, wherein the data signal is a multitoned frequency shift keyed (MFSK) signal, and wherein the duty cycle is determined by a lowest frequency of the MFSK signal.

* * * * *